United States Patent

[11] 3,624,616

[72] Inventor Rajani Manibhai Patel
Arcadia, Calif.
[21] Appl. No. 882,105
[22] Filed Dec. 4, 1969
[45] Patented Nov. 30, 1971
[73] Assignee Burroughs Corporation
Detroit, Mich.

[54] DYNAMIC ALLOCATION OF MULTIDIMENSIONAL ARRAY MEMORY SPACE
17 Claims, 10 Drawing Figs.

[52] U.S. Cl. .......... 340/172.5
[51] Int. Cl. .......... G06f 9/20
[50] Field of Search .......... 235/157; 340/172.5

[56] References Cited
UNITED STATES PATENTS

| | | | |
|---|---|---|---|
| 3,222,649 | 12/1965 | King et al. .......... | 340/172.5 |
| 3,487,370 | 12/1969 | Goshorn et al. .......... | 340/172.5 |
| 3,505,647 | 4/1970 | Torfen et al. .......... | 340/172.5 |
| 3,510,847 | 5/1970 | Carlson et al. .......... | 340/172.5 |

*Primary Examiner*—Raulfe B. Zache
*Assistant Examiner*—Melvin B. Chapnick
*Attorney*—Christie, Parker & Hale

ABSTRACT: A method and apparatus by which all the dope vectors and data of a multidimensional array can be allocated space in memory when needed during execution of a computer program. Only a single descriptor including the size of the first dimension of the array and a table of sizes of higher dimensions of a data array are made available in memory at the start of the program. When the program calls for a particular data location in the array, only the necessary dope vectors for each dimension of the array are generated and stored in memory to make the particular data location present in memory.

INVENTOR
RAJANI MANIBHAI PATEL

BY

Christie, Parker & Hale
ATTORNEYS

DYNAMIC ALLOCATION OF MULTIDIMENSIONAL ARRAY MEMORY SPACE

FIELD OF THE INVENTION

This invention relates to digital processors, and more particularly, is concerned with a method and apparatus of allocating space in memory to data in a multidimensional array as the data location is required during the execution of the program.

BACKGROUND OF THE INVENTION

In executing the instructions comprising a computer program, the processor requires the presence of space in the memory for storing or obtaining operands. If an instruction requires a single operand, the instruction may address a particular location in memory to obtain this operand. However, frequently a single instruction may require operands from an array of data. Since the instruction can address only a single location in memory at a time, various indexing techniques have been developed by which the instruction can be made to access successive locations in memory to operate on an array of data. One technique which has been used which simplifies the problem of assigning memory space to a program is to utilize what are sometimes referred to as data descriptors. A data descriptor defines an array of data starting at some specified base address and having a particular length. The data descriptor also indicates whether the data array is present in the core memory. The use of data descriptors to accomplish indirect addressing is described in more detail in U.S. Pat. No. 3,222,649, assigned to the same assignee as the present invention. Such an arrangement of utilizing data descriptors has the advantage that at the time the program is compiled only a single descriptor word need be generated during declaration time to define a whole array of data. Also the space in memory can be allocated to the descriptor when the descriptor is first encountered during the execution of the program. In such a prior art arrangement a presence bit in the descriptor, if set to 0, produces a Presence Bit Interrupt condition. The required space for the array in memory is then allocated by the master control program and the operation returned the program. This arrangement permits space to be allocated dynamically during execution of the program. A descriptor which references elements which are not present in memory is referred to as an "absent" descriptor, while a descriptor which references elements which are present in memory is referred to as a "-present" descriptor.

Large blocks of numerical data may be treated as multidimensional arrays in which the elements are specified by sets of integers. For example, a matrix may be expressed as a two-dimensional array for which a set of two integers, the row number $i$ and the column number $j$, is used to identify a particular element in the array. A three-dimensional array utilizes three integers to single out a particular element. The elements in such an array are usually denoted by the symbol $A(ijk)$ where, for example, $i$, $j$ and $k$ are three independent integral variables of a three-dimensional array. In terms of storage of an array of data, the array is in effect a function of a number of integer variables, the values of the function being explicitly stored in the memory and the values of the variables being used to locate the function value in the memory. A single data descriptor then can be used to locate all the elements in a single dimensional array, since the address field of the descriptor defines the location of the first element in the array and the length field defines the limit of the array. To locate any element in the single dimensional array, it is only necessary to increment the address field of the descriptor by the required integer value of the one dimensional variable to locate the desired data. The length field provides a check to prevent going outside the array.

To locate data in a multidimensional array using data descriptors, additional sets of descriptors called dope vectors are required for each additional dimension. Consider the three-dimensional array $A(i, j, k)$. The number of data areas in memory is then equal to $i \times j$ and each data area includes $k$ elements or locations. When the program calls for a data element in the array, it accesses a descriptor, called the "mother" descriptor (MOM). If there is more than one dimension in the array, MOM points to a first dope vector consisting of a set of descriptors corresponding in number to the maximum integer value of $i$. If there are more than two dimensions, each descriptor in the first dope vector points to one of a group of second dope vectors, each second dope vector consisting of a set of descriptors corresponding in number to the maximum integer value of $j$. Assuming a three-dimensional array, each of the descriptors in the second dope vectors points to an area of data, each area containing the number of locations or elements corresponding in number to the maximum integer value of $k$.

In the past, all of the descriptors defining a multidimensional array of data were provided at declaration time as part of the program. Memory space was then allocated to the data in the array during execution of the program by referencing the descriptor which signals that the data is not present in memory. This produces an interrupt condition causing operation of the computer to switch to a control mode in which the master control program operates to put the required data in memory.

In case of a multidimensional array, in the past it has been necessary to make all of the descriptors, including the "-mother" descriptor and all of the dope vectors available in memory at declaration time. All of the descriptors, except those in the highest order dope vectors, had to be made "-present" descriptors, i.e., they in turn pointed to descriptors which were already present in memory as part of the program. The descriptors of the highest order dope vector, since they pointed to data, remained as "absent" descriptors until the data space was actually needed in the execution of the program.

Such an arrangement is wasteful of memory space because all of the descriptors necessary to define the entire multidimensional array had to be made part of the program in declaration time and therefore required space in memory when the program was loaded into the memory for execution. Since in the running of the program during execution time none or only a few elements of the array might ever be referenced, this resulted in a highly inefficient use of memory space.

SUMMARY OF THE INVENTION

The present invention overcomes the foregoing and other difficulties with the prior art arrangement by providing a method and apparatus for allocating memory space dynamically during the execution of a program to the dope vectors of a multidimensional array. Only the "mother" descriptor and an Array Information Table (AIT) of dimension sizes, i.e., the maximum integer values for all but the first dimension of the array are initially present in memory. A Presence bit in the "-mother" descriptor is off, indicating that it is an "absent" descriptor, i.e., that it does not refer to data present in memory. The address field of the descriptor is arranged to point to the address location of the first item in the table, namely the location of the size of the second dimension of the array. The highest order bit in the address field of the "-mother" descriptor is set to one, indicating that the descriptor references a dope vector that has not been allocated to a space in memory.

During execution of the object program, when the array is first referenced by the program, the program addresses the "-mother" descriptor. Since the Presence bit indicates an "absent" descriptor, the program is interrupted. OPeration branches to the master control program which enters a routine for assigning space in memory corresponding to the maximum size of the first dimension of the array specified by the length field of the "mother" descriptor. The a descriptor is generated using the size of the next dimension derived from the table as the value in the length field of the descriptor and using the address of the next location in the table as the value in the address field of the descriptor. If the length field is derived from the last location in the table, as indicated by a special bit, the highest order bit of the address field is set to zero, as in the usual descriptor that references data not present in memory. At the same time, the rest of the address field is set to zero.

This generated descriptor is then stored in all locations in the assigned space set aside in memory to provide the first dope vector of the array. The "mother" descriptor is also altered to make it a "present" descriptor and to change the address field to point to the first or base address location of the space in memory containing the newly generated fist dope vector.

Operation then returns to the object program which now addresses a "present" mother descriptor. The address field is indexed by the assigned value of the integer defining the first dimension of the data array, and the corresponding descriptor in the newly generated dope vector is accessed. Since this is an "absent" descriptor, the above process is repeated, generating a second dope vector. If this corresponds to the last dimension in the table, after indexing, the selected descriptor in the second dope vector is made "present" by assigning space corresponding to the size of the last dimension of the array. Thus data space in the array is made available to the program, but only the portion of the dope vectors necessary to access that particular group of elements of the memory array are made "-present" in memory.

BRIEF DESCRIPTION OF THE DRAWINGS

For a better understanding of the invention reference should be made to the accompanying drawings wherein.

DETAILED DESCRIPTION OF THE DRAWINGS

The preferred embodiment of the present invention is described in the context of a data processing system of the type described in U.S. Pat. No. 3,222,649 which utilizes a stack memory used for temporary storage of operands. In the place of he usual single address or three-address type of instruction, the program is made up of a string of syllables which either address memory or initiate a logical or arithmetical operation. The type of syllable which requires addressing of memory includes an address as part of the program syllable.

As further described in U.S. Pat. No. 3,222,649, a program syllable in addressing memory normally places an operand in the stack memory where it is available to be used by a subsequent operator-type syllable. However instead of encountering data at the particular address location referenced by the syllable, it may encounter a data descriptor. The data descriptor includes a base address field and a length field to define a data area in memory. Thus the descriptor provides a means of doing indirect addressing and also provides a means by which, through suitable indexing, a single syllable can reference a number of data locations in sequence in memory. In addition, the data descriptor includes a bit, referred to as the Presence bit. When the Presence bit is off, this is an indication that the data area defined by the descriptor has not yet been made available to the program in the memory. When this occurs, a Presence Bit Interrupt condition is initiated which transfers operation of the processor to the control mode, in the manner described in more detail in U.S. Pat. No. 3,286,236. An interrupt condition clears the registers of processors, loading them in the stack portion of memory. The operation then branches to a subroutine, which is part of the master control program, the subroutine causing an area in memory of the required size defined by the descriptor length field to be made available to the program. The manner in which a particular size memory space can be allocated to a program as required, is described in more detail in copending application, Ser. No. 858,748, filed Sept. 17, 1969, and assigned to the same assignee as the present invention. Once the space is allocated, the base address of the available space is inserted in the descriptor and the Presence bit is turned off, changing the descriptor from an "absent" descriptor to a "present" descriptor.

Figures 1, 2:
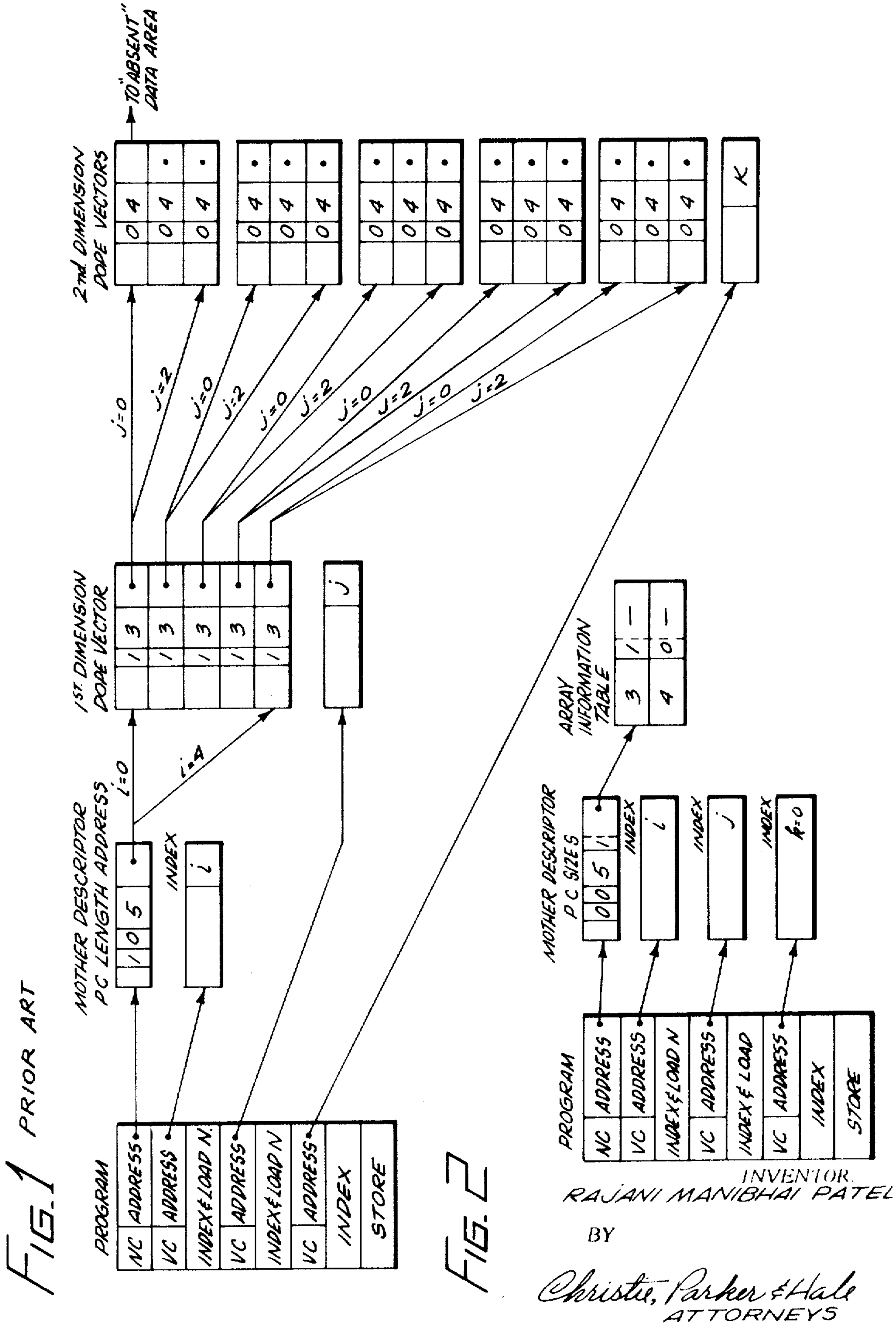
FIG. 1 is a chart illustrating portions of an object program present in memory prior to start of the execution of the program, as provided by prior art.
FIG. 2 is a similar chart illustrating portions of an object program present in memory prior to start of the execution of the program, as provided by the present invention.

With the above description in mind by way of background, reference should be made to FIG. 1. There is illustrated, according to the teaching of the prior art the condition of memory prior to executing a program in which a multidimensional data array is required. The left-hand column shows a portion of the program string of the object program stored in sequential locations in the core memory. The first syllable in the program is a Name Call (NC) syllable which is used to address a data descriptor in memory and transfer it to a temporary storage, called stack. The stack operates on a first-out basis. Two registers provide the top two positions of the stack memory. The address field of the syllable points to a location in main memory where there is stored a "mother" descriptor, such as shown in column 2 of the figure. In the prior art computers where a multidimensional array is encountered, the "-mother" descriptor must always be a "present" descriptor during the execution of the program. Therefore the Presence bit (P) is set to 1 in the "mother" descriptor, as shown in FIG. 1. The length field is shown, by way of example only, as defining a memory size including five memory locations. The address field of the "mother" descriptor in turn points to the base address of an area in memory containing the first dimension dope vector of the array.

Once the data descriptor is read out of memory into the stack by the Name call syllable of the program, the next syllable in the program is fetched. As shown in FIG. 1, this is a value Call (VC) syllable having an address which points to an area in memory where an integer value $i$ of the first dimension of the array is stored. In the example shown, the value $i$ may have any integer value from 0 to 4 for a field of 5 locations.

Once the integer value $i$ is read out of memory and placed in the stack by the Value Call syllable, the next program syllable is fetched, called an Index and Load Name syllable. This syllable causes the processor to index the address of the "mother" descriptor by the value of $i$ so that the address in the "mother" descriptor now points to a particular element of the first dimension dope vector present in main memory. The Index and Load Name syllable on completion, causes the contents of the main memory at the location of the indexed address of the "mother" descriptor to be loaded from the first dimension dope vector into the stack. As shown by column 3 of FIG. 1, each descriptor in the first dimension dope vector includes a length field which, by way of example, is shown as being 3, and having an address which points to the base address of the second dimension dope vector of the array.

The next syllable in the program is a Value Call syllable which points to a location in memory where the index value $j$ for the second dimension of the array is stored. The value of $j$ is read out into the stack, and the program advances to the next program syllable, which is another Index and Load Name syllable. Thus the selected descriptor in the first dimension dope vector is indexed by the value $j$ so as to point to a particular descriptor in the second dimension dope vector, as shown in column 4 of FIG. 1. At the completion of the Index and Load Name syllable, the selected one of the descriptors in the second dimension dope vector is placed in the top of the stack.

Assuming a three-dimensional array, the descriptors in the second dimension dope vector point to data areas in main memory when the descriptors are present, i.e., when the Presence bit has been set to 1. If the Presence bit has not been set to 1, the Presence Bit Interrupt takes place during execution of the object program, and a data area is then made available in memory with the base address placed in the address field of the corresponding descriptor of the second dimension dope vector. The length field of these descriptors in turn defines the size of the corresponding data areas which are made present in memory and the address portion of these descriptors points to the base address of the respective data areas when made present.

The next syllable in the program string is a Value Call syllable which places the integer value of the third dimension $k$ of the multidimensional array in the stack. The next syllable in the string might be an Index and Load Value syllable or, as shown, simply an Index syllable followed by a Store operator. The "present" descriptor from the second dimension dope vector is indexed in order to point to a particular location in the data area. The contents of this location is then read out into the stack or an operand is stored at this location.

In the arrangement as described in connection with FIG. 1, it will be noted that all of the descriptors must have their Presence bit on except the descriptors in the highest order dope vector, which descriptors point to actual data areas. The highest order dope vectors need not be "present" since the usual Presence Bit Interrupt will make memory space available to the descriptors. However, all of the the lower order dope vectors and the "mother" descriptor must be "present" descriptors and all of the dope vectors and "mother" descriptors must be loaded in memory before execution of the object program is initiated.

According to the teaching the present invention, the descriptors of all the dope vectors of the array need not be present in memory during execution of the object program. At declaration time when the program is being compiled the "-mother" descriptor for the data array is provided in memory and made available to the program together with an array Information Table. As shown in FIG. 2, the "mother" descriptor is an "absent" descriptor in that the Presence bit is set to 0. The length field of the "mother" descriptor indicates the size of the first dimension of the array. However, the address field is provided with an address which points to the first location of the Array Information Table. Also the highest order bit position of the address field is set to 1, indicating that the "-mother" descriptor is referencing a dope vector which has not yet been made available in memory. Each location in the Array Information Table includes the size respectively of the second, third, or any higher order dimensions of the array, and includes a special bit which is set to 1 in all but the last word in the table. This special bit is used to identify the last item in the Array Information Table and at the same time serves the same function as the special bit in the address field of the "mother" descriptor.

During execution of the object program, the first Name Call syllable in the program causes the "mother" descriptor to be read out of memory and placed in the top of the stack. The next Value Call syllable causes the Index value to be placed in the stack. The next program syllable, namely the Index and Load Name operator, is then executed. However, since the Presence bit in the "mother" descriptor is 0, a Presence Bit Interrupt condition is signaled to the processor. The Presence Bit Interrupt condition, as shown by the flow diagram of FIG. 3, initiates a routine for getting the required space in memory. As described in more detail in the above-identified copending application, Ser. No. 858,748, the operation of getting space involves finding an available space in memory from a linked chain of available spaces, transferring the required space to a linked chain of in-use spaces in memory and leaving the base address of the space in the top of the stack. The "absent" descriptor that caused the interrupt is available in the the stack during the Presence Bit Interrupt routine. A test is made to determine whether the special bit is the highest order location of the address field in the descriptor is a 0 or a 1. If the special bit is 1, a fixup routine is initiated as part of the interrupt by which the space in memory is loaded with descriptors defining the first dope vector of the array. These descriptors are all identical and include a length field derived from the information in the Array Information Table, and an address field which points to the next location in the Array Information Table, with the special bit being set to 1. If the descriptor that caused the Presence Bit Interrupt to occur included an address field pointing to the last item in the Array Information Table, the special bit is set to 0 and the address field is set to 0 in the dope vector being generated. This is necessary because the dope vector being generated provides descriptors which point to data areas and not to higher order dope vectors in the array.

Figures 3, 4:
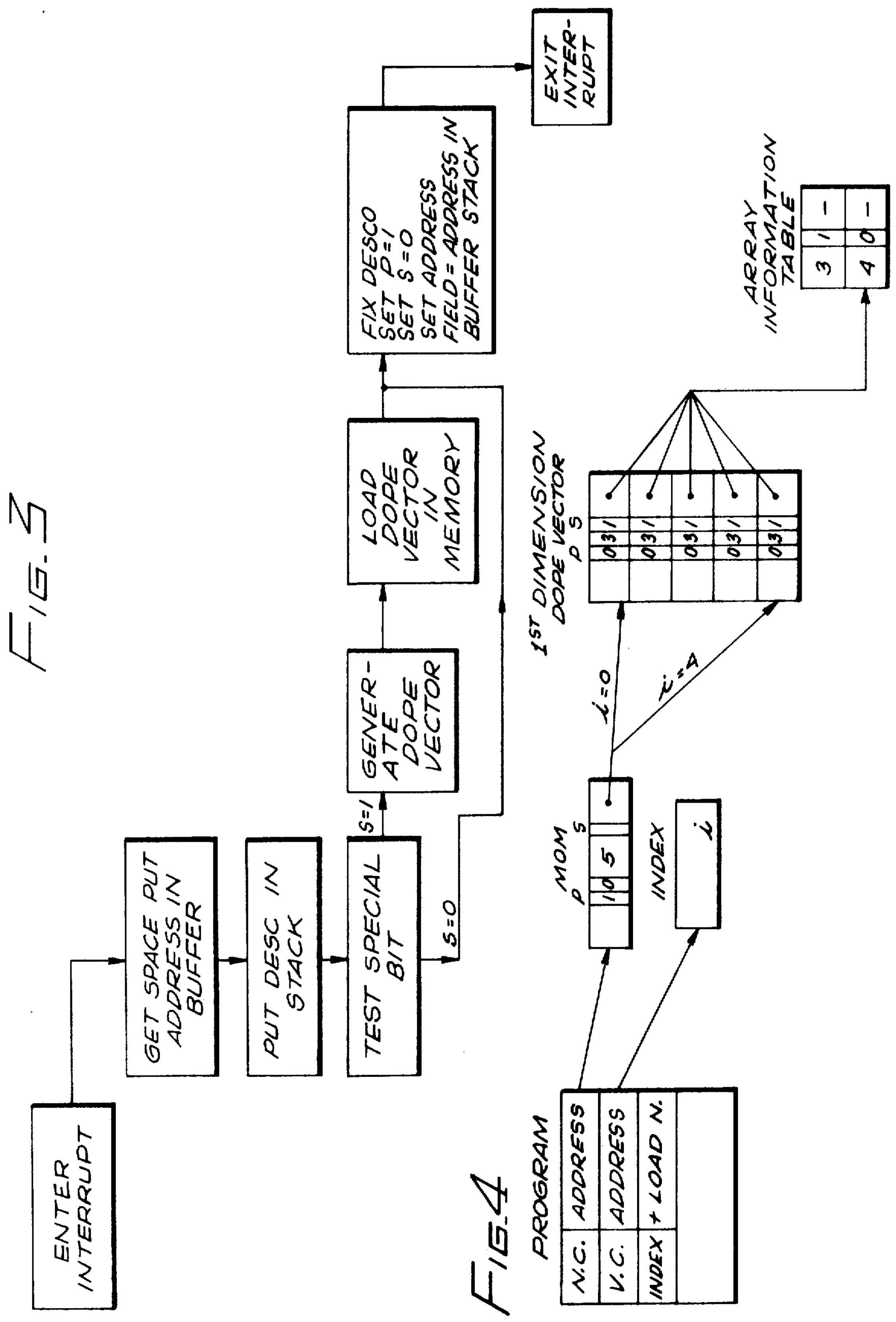
FIG. 3 is a flow diagram useful in explaining the operation of a processor utilizing the present invention.
FIGS. 4 and 5 are charts illustrating the contents of memory during various stages of executing an object program.

Continuing with the flow diagram of FIG. 3, after the descriptors comprising the dope vector are generated and stored in memory, the descriptor which caused the interrupt is modified to set the Presence bit to 1, to set the special bit to 0, and to set the address field to the base address of the space in memory containing the generated dope vector. With these special bits set to 0, the Presence bit routine is terminated and the execution of the object program returns to the operation in progress at the time the interrupt condition was encountered, namely the Index and Load Name operator. This operator can now be fully executed because the descriptor is now a "present" descriptor whose address points to the dope vector of the array which has been loaded into memory.

The condition of the various areas in memory at the completion of the Presence Bit Interrupt is shown in FIG. 4. The "mother" descriptor has been modified as shown so that the Presence bit has been set to 1, special bit has been set to 0, and the address field points to the first dimension dope vector. The descriptors in the first dimension dope vector in turn each have the Presence bit set to 0, the length field set to the size of the second dimension of the array, the special bit set to 1, and the address field pointing to the next location in the Array Information Table.

Figure 5:
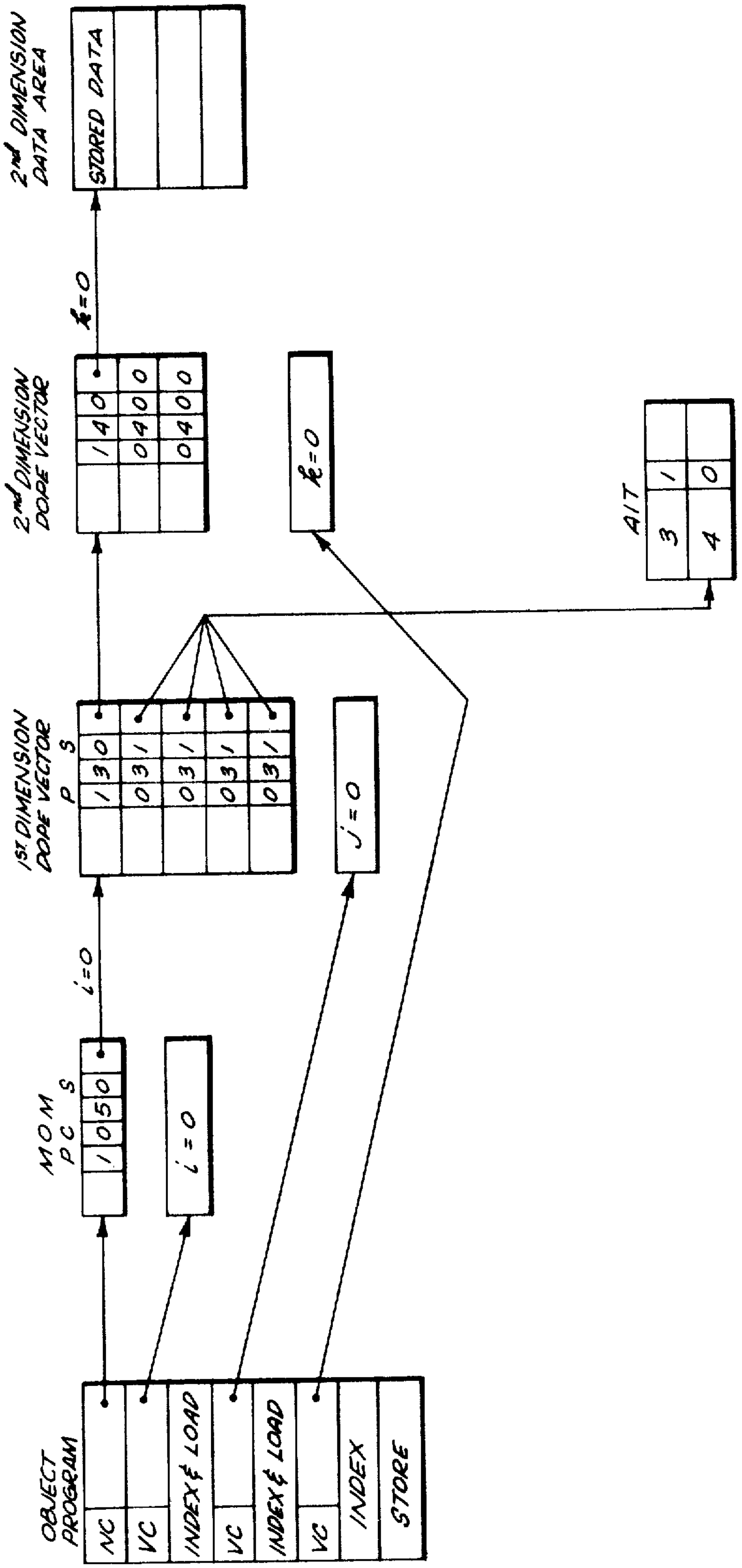

After completion of the Index and Load Name operation, a descriptor from the first dimension dope vector is provided in stack memory, the index value $j$ of the second dimension is then loaded into the stack memory and another Index and Load Name operator is encountered in the object program. Again a Presence Bit INterrupt is encountered because the Presence bit of the descriptor derived from the first dimension dope vector is an "absent" descriptor. FIG. 5 shows the condition of memory at the end of Store operator in the object program, assuming index values of 0 for each of the three dimensions $i, j$ and $k$.

It will be noted that at the time the second dimension dope vector is generated, the first descriptor in the first dimension dope vector is modified by the Presence bit routine to set the Presence bit to 1, to set special bit to 0, and to set the address field to point to the first descriptor in the second dimension dope vector. At the same time the second dimension dope vector descriptors are generated and loaded in an acquired space in memory. The generated dope vector again has the length field set from the information stored in the Array Information Table. Since this involves the last item in the table, the special bit is set to 0 in the second dimension dope vector descriptors generated by the Presence Bit Interrupt routine. Also the address field is set to 0. Assuming an index value for $j$ of 0, the first descriptor of the second dimension dope vector is then left in the stack.

The subsequent Value Call syllable places the index value of the third dimension k, assumed to be 0, in the stack and then the Index operator is executed. Again a Presence Bit Interrupt is encountered because the Presence bit is off in all the descriptors of the second dimension dope vector. A space of the required length specified by the length field of the descriptor is acquired in memory during the Presence bit routine in the same manner as described above. However, because the special bit in the descriptor causing the interrupt is 0 instead of 1, no additional dope vector is generated, but the descriptor causing the Presence Bit Interrupt is modified to set the Presence bit to 1 and to set the address field to the address of the space allocated in memory by the Presence bit routine.

After exiting from the Presence bit routine and completing the Index operation, the address of the second dimension dope vector descriptor is indexed by the value of *k*, providing an address of a location in the data area. The Store operator of the object program then causes a word to be stored in that location.

It should be noted that instead of an Index operator followed by a Store operator, the object program may provide an Index and Load Value operator, in which case the word is transferred from the particular selected location in the data area to the stack memory. Thus the object program can be arranged to either store data in or acquire data from any location in a multidimensional array.

A comparison of FIG. 1 and FIGS. 2 and 5 clearly shows the advantage of the present invention. In the prior art arrangement of FIG. 1, all of the descriptors of all the dope vectors must be present in memory before the object program is executed. Depending upon the size of the multidimensional array, it is apparent that this may involve a large amount of memory space which must be allocated to the program before the program is even executed. In contrast, FIG. 2 shows that the amount of space allocated to memory at the start of the execution of the program utilizing the techniques of the present invention involves a single "mother" descriptor and an Array Information Table regardless of the size of the array. Even after access to a particular element in the array, as shown in FIG. 5, during the execution of the object program, only the portion of the second and any higher order dimension dope vectors necessary to reach a particular element in the array need be made present in memory. Thus not until such time in the execution of the object program that all areas of the array have been referenced would all of the space required to store all the dope vectors have to be assigned in memory. Thus the invention provides an arrangement for a dynamic allocation of memory space to a multidimensional array.

Figure 6:
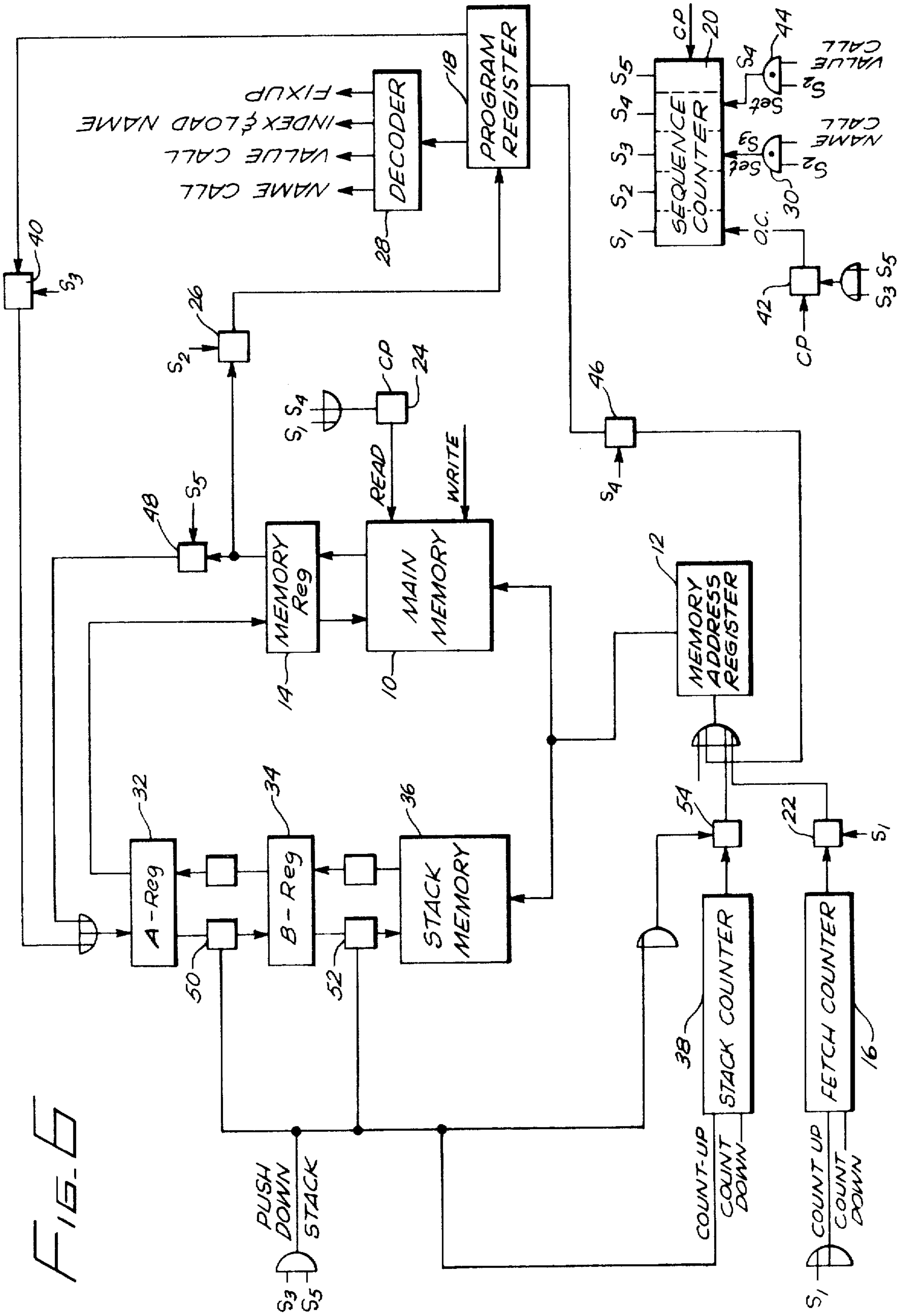
FIGS. 6 and 7 are schematic block diagrams of the processor incorporating features of the present invention.

Referring to FIGS. 6 through 10, there is shown a preferred embodiment of a processor incorporating the features of the present invention. Referring specifically to FIG. 6, the processor includes a main memory 10 which, for example, may be a random access core memory which is addressed by the contents of an address register 12. Transfer of words into and out of the main memory 10 is through a memory register 14. A fetch counter 16 is used to fetch the program syllables in sequence from the amino memory and placing them in a program register 18. Control of the fetch cycle of operation is accomplished by a sequence counter 20 which is part of the central control of the processor. The sequence counter advances through a group of states which control the operation of the computer in carrying out the fetch operation and in executing the program syllables, such as described in more detail in the above-identified U.S. Pat. No. 3,222,649.

The fetch cycle takes place during the sequence states $S_1$ and $S_2$ of the sequence counter 20. With the sequence counter 20 set initially at the $S_1$ state, the address of the next program syllable is transferred from the counter 16 by a gate 22 to the memory address register 12. The $S_1$ state is also applied to a gate 24 which gates the next clock pulse to the Read cycle control input of the main memory 10, causing the contents of the address location to be placed in the memory register 14. At the same time the clock pulse advances the sequence counter to the $S_2$ state. The program syllable in the register 14 is now transferred by a gate 26 to the program register 18 in response to the $S_2$ state. This completes the fetch cycle of the processor.

Assuming the processor is attempting to access a multidimensional array in main memory, the first program syllable placed in the program register is a Name Call syllable and is now present in the program register 18. A decoding circuit 28 determines that a Name Call syllable is present in the program register 18 and activates an output line designated Name Call. This line is applied to an AND-circuit 30 together with the $S_2$ state, setting the sequence counter to the $S_3$ state following the fetch cycle.

The function of the Name Call syllable is to place the address of the "mother" descriptor in a stack memory. The stack memory, as shown in FIG. 6, includes an A-register 32, a B-register 34, and a stack memory 36. While indicated as a separate unit in FIG. 6, it will be understood that the stack addressable memory 36 may be a portion of the main memory 10. A stack counter 38 always points to the top address location within the stack memory 36. As described in the above-identified U.S. Pat. No. 3,222,649, the stack operates as a last-in first-out device in which successive words placed in the stack are entered into the A-register 32, "pushed down" to the B-register 34, and then into the top position of the stack memory 36. Words are removed from the stack in the reverse order, being moved up from the last position in the stack memory 36 to the B-register 34 and then to the A-register 32. Each time a word is added to the stack, the stack counter 38 is advanced by 1 and each time a word is removed from the stack, the stack counter 38 is reduced by 1.

While the sequence counterset to $S_3$ by the Name call syllable in the program register 18, an address field in the program syllable is transferred by a gate 40 to the A-register 32 of the stack. This address points to the location in main memory of the "mother" descriptor which was stored in the main memory at the time the program was loaded into the processor. It will be understood that the address may be merely a relative address which must be further modified by conventional indirect addressing techniques to point to the absolute address in which the description is loaded in memory. The address having been loaded in the stack, the next clock pulse is passed by a gate 42 to which the $S_3$ state is applied for generating an OC pulse and resetting the sequence counter back to $S_1$, causing a fetch of the next program syllable.

The next program syllable placed in the program register 18 is a Value Call syllable which is used to place the value of the variable *i* of the multidimensional array into the stack. An AND-circuit 44 in response to the $S_2$ state and the Value Call line from the decoder 28 sets the sequence counter 20 to $S_4$. In response to $S_4$, a gate 46 transfers the address field of the syllable in the program register 18 to the address register 12. $S_4$ is also applied to the gate 24 to cause a Read cycle, placing the index value of the variable *i* in the memory register 14. The sequence counter 20 then advances by the next clock pulse to the $S_5$ state during which a gate 48 transfers the value of *i* to the A-register 32. It should be noted that in both the $S_3$ and the $S_5$ state the stack is pushed down by applying the $S_2$ or $S_5$ state to a gate 50 coupling the A-register to the B-register, a gate 52 coupling the B-register to the stack memory, a gate 54 coupling the contents of the stack counter to the address register 12 to address the top of the stack, and to count up the stack counter 38. At the end of the $S_5$ state, the gate 42 provides a clock pulse for resetting the sequence counter 20 back to the start of the next fetch cycle.

Figure 7:
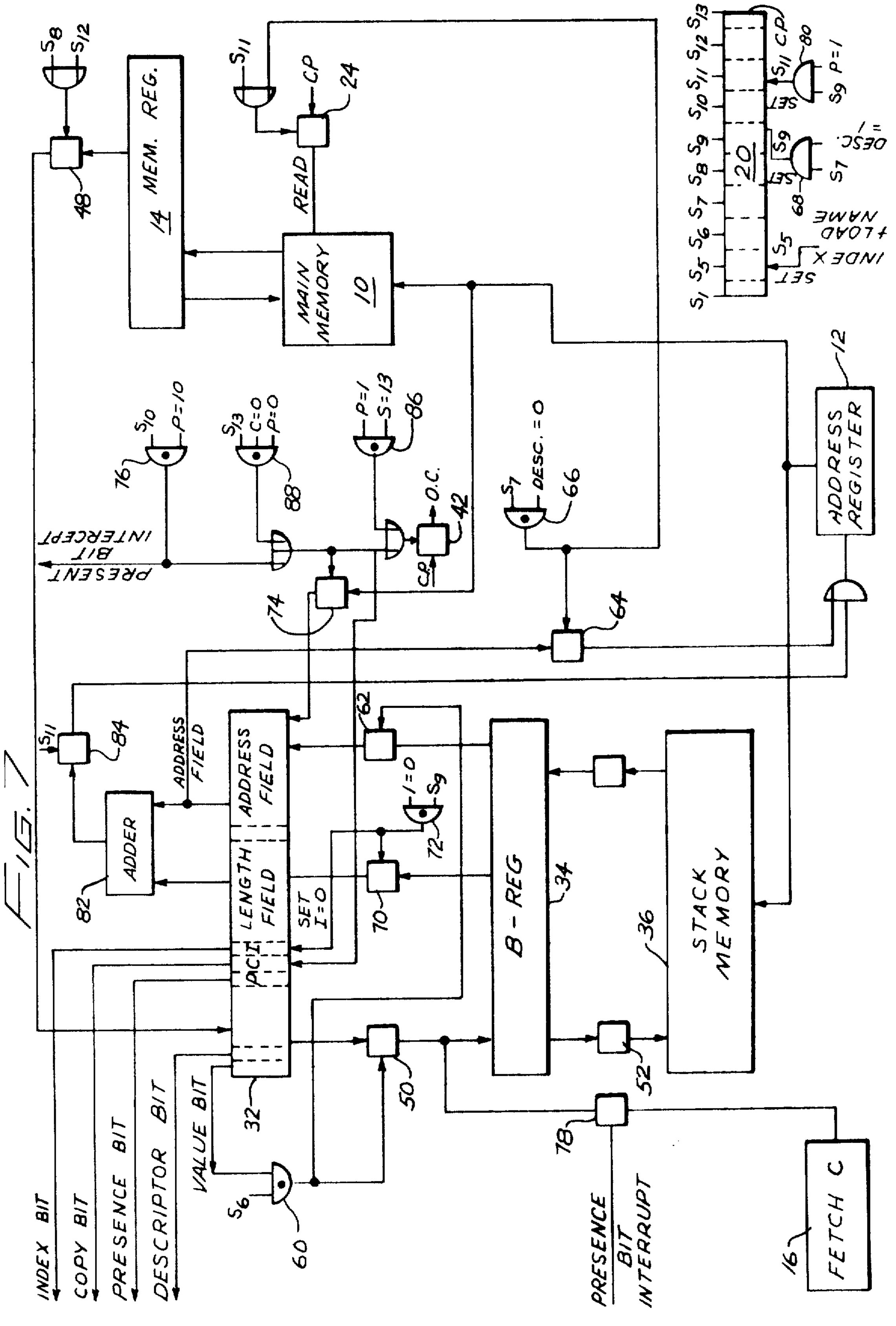

Referring to FIG. 7, the operation of the processor in response to an Index and Load Name operator is shown. Assuming that the operator has been placed in the program register 18 in the manner described above in connection with FIG. 6, the Index and Load Name output of the decoder 28 sets the sequence counter to the $S_6$ state to start execution of the operator. First a Value bit of the word in the A-register 32 is sensed together with the $S_6$ state by an AND-circuit 60. If the A-register 32 contains a value rather than a descriptor or an address, such as the index value placed in the A-register by the previous Value Call syllable, the contents of the A-register 32 and B-register 34 are exchanged. This is accomplished by the output of the AND-circuit 60 which is applied to the gate 50 which transfers the contents of the A-register to the B-register and to a gate 62 which transfers the contents of the B-register to the A-register. This causes the descriptor placed in the stack by the Name Call syllable to be transferred to the A-register 32 and the index value to be placed in the B-register.

With the sequence counter advanced to the $S_7$ state, a test is made on a Descriptor bit to determine if the word in the A-register is a descriptor or merely an address. If it is merely an address, the address is transferred to the address register 12 through a gate 64. The gate 64 is operated in response to the output of an AND-circuit 66 which senses the $S_7$ state and that the descriptor bit is equal to 0. The output of the AND-circuit 66 is also applied to the gate 24 to cause a Read cycle of the main memory. A "mother" descriptor is placed in the memory register from the specified address location. During the $S_8$ state, the descriptor is then transferred by the gate 48 from the memory register 14 to the A-register 32 and the sequence counter advances to the $S_9$ state. If, on the other hand, the Descriptor bit indicates that a descriptor is already in the A-register, the sequence counter 20 is set directly to the $S_9$ state from the $S_7$ state by the output of an AND-circuit 68 which senses the $S_7$ state and that the Descriptor bit is equal to 1.

With the "mother" descriptor now present in the A-register 32, a test is made of the Index bit. This bit, as explained more fully in U.S. Pat. No. 3,510,847 and assigned to the same assignee as the present invention, indicates whether the length field of the descriptor contains an index value for indexing the address field or the size of an area in memory. Normally the Index bit would be 0, indicating that the length field contains the size of the required area in memory associated with the descriptor. During the $S_9$ state, if the Index bit is 0, the index value in the B-register 34 is transferred to the length field of the descriptor in the A-register 32. This is accomplished by a gate 70 which is operated in response to the output of an AND-circuit 72 that senses the Index bit is equal to 0 and the sequence counter is in the $S_9$ state. The output of the AND-circuit 72 also sets the Index bit of the descriptor in the A-register 32 to 1.

Next a test is made of the Presence bit in the descriptor to determine whether the descriptor points to an available space in memory. With the sequence counter advanced to the $S_{10}$ state, if the Presence bit is 0, indicating an "absent" descriptor, the address in the address register 12, which is the address of the "mother" descriptor in memory 10, is transferred by a gate 74 to the address field of the descriptor in the A-register 32. The gate 74 is actuated by the output of an AND-circuit 76 which senses that the Presence bit is equal to 0 and that the sequence counter is in the $S_{10}$ state. Also a Copy bit in the descriptor in the A-register is set to 1, indicating the descriptor is a copy of "mother" descriptor. The output of the AND-circuit 76 also signals a Presence Bit Interrupt which causes the processor to go into the control state and branch to a Presence Bit Interrupt routine stored as part of the master control program. The manner in which an interrupt is handled is described in more detail in the above-identified U.S. Pat. No. 3,286,236. At the same time, a return control word is placed in the B-register 34 which contains the contents of all the registers necessary to effect a return to the object program after the interrupt routine is completed. For example, the contents of the fetch counter 16 is applied to the B-register 34 through a gate 78 in response to the Presence Bit Interrupt from the AND-circuit 76. At termination of the interrupt operation, the fetch counter and other registers are reloaded from the stack, permitting execution of the object program to continue at the same point in the program. The output of the AND-circuit 76 is also applied to the gate 42 to generate an OC, which resets the sequence counter to initiate the next fetch cycle. The fetch counter is set to address the first syllable in the Presence bit routine, in the manner described in U.S. Pat. No. 3,286,236.

If the Presence bit of the descriptor in the A-register 32 is set to 1, indicating a "present" descriptor, no Presence Bit Interrupt is required. In this case, the sequence counter advances automatically to the $S_{11}$ state from the $S_9$ state by the output of an AND-circuit 80 which senses the $S_9$ state of the sequence counter and the Presence bit =1 condition. During the $S_{11}$ the index value in the length field of the descriptor is added to the address field of the descriptor in the A-register 32 by an adder 82. The output of the adder 82 is transferred by a gate 84 to the memory address register 12. Thus the indexed address now points to a selected one of the descriptors in the first dope vector of the array in the memory 10. The $S_{11}$ state is also applied to the gate 24, causing the particular descriptor of the first dope vector to be transferred to the memory register 14. With the sequence counter 20 advanced to the $S_{12}$ state, the gate 48 transfers the descriptor of the first dope vector to the A-register 32. If this is a "present" descriptor, the operation is complete. An AND-circuit 86 senses the $S_{13}$ state and senses the Presence bit is equal to 1. The output of the AND-circuit 86 is applied to the gate 42 to generate an OC, resetting the sequence counter 20 to fetch the next program syllable.

If the Presence bit is zero, the descriptor is modified by transferring the address from the register 12, to the address field of the descriptor and setting the Copy bit to 1. Thus the descriptor in the stack is made into a copy descriptor with the address field pointing to the original descriptor of the first dope vector in the memory 10. This is accomplished by the output of an AND-circuit 88 which senses the $S_{13}$ state of the sequence counter 20 and senses that the Presence bit and the Copy bit are both zero. The output of the AND-circuit 88 is applied to the gate 74 to transfer the address from the address register 12 to the address field and is applied to set the copy bit to 1. It is also applied to the gate 42 to generate an OC, terminating execution of the Index and Load Name operation. There is now either a "present" descriptor in the A-register 32 of the stack whose address field points to the base address of the second dimension dope vector in the memory, or there is a Copy descriptor whose address field points to the "absence" descriptor in the first dimension dope vector of the memory 10.

Figure 8:
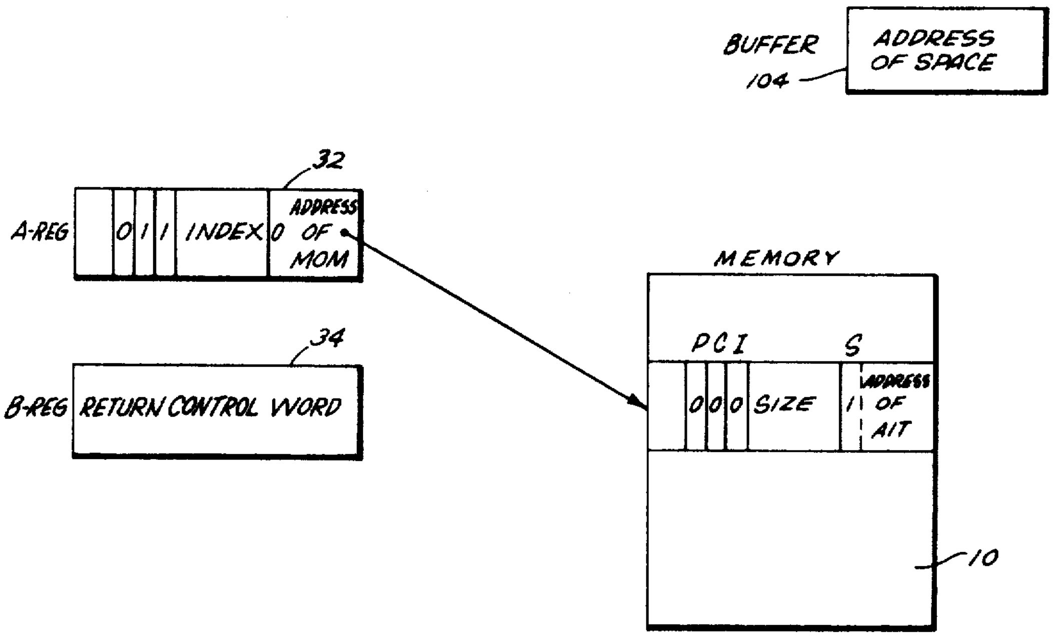
FIGS. 8 and 9 are charts illustrating the contents of memory and two registers in the processor at various stages of operation of the processor.

At the start of the Presence Bit Interrupt operation, the contents of the A-register, B-register, and location of the "-mother" descriptor in the main memory 10 is shown in FIG. 8. A copy descriptor in the A-register 32 has the Presence bit set to 0, the Copy bit set to 1, and the Index bit set to 1. The index value is loaded in the length field of the descriptor and the address field points to the address of the "mother" descriptor in the memory 10. The B-register contains the return control word. In the "mother" descriptor, the Presence bit is 0, the Copy bit is 0, the Index bit is 0, the length field contains the size of the first dimension dope vector of the array in terms of the required number of words in memory, and the address field contains the Special bit set to 1 and the address of the second dimension information in the Array Information Table.

During the Presence Bit Interrupt, the master control program, using the size information in the "mother" descriptor, finds an available space in memory of the required size and links it into the "in-use" memory spaces and provides the base address of the space in a buffer register in the processor. This routine, referred to as Getspace routine, is described in the above-mentioned copending application, Ser. No. 858,748.

Figure 10:
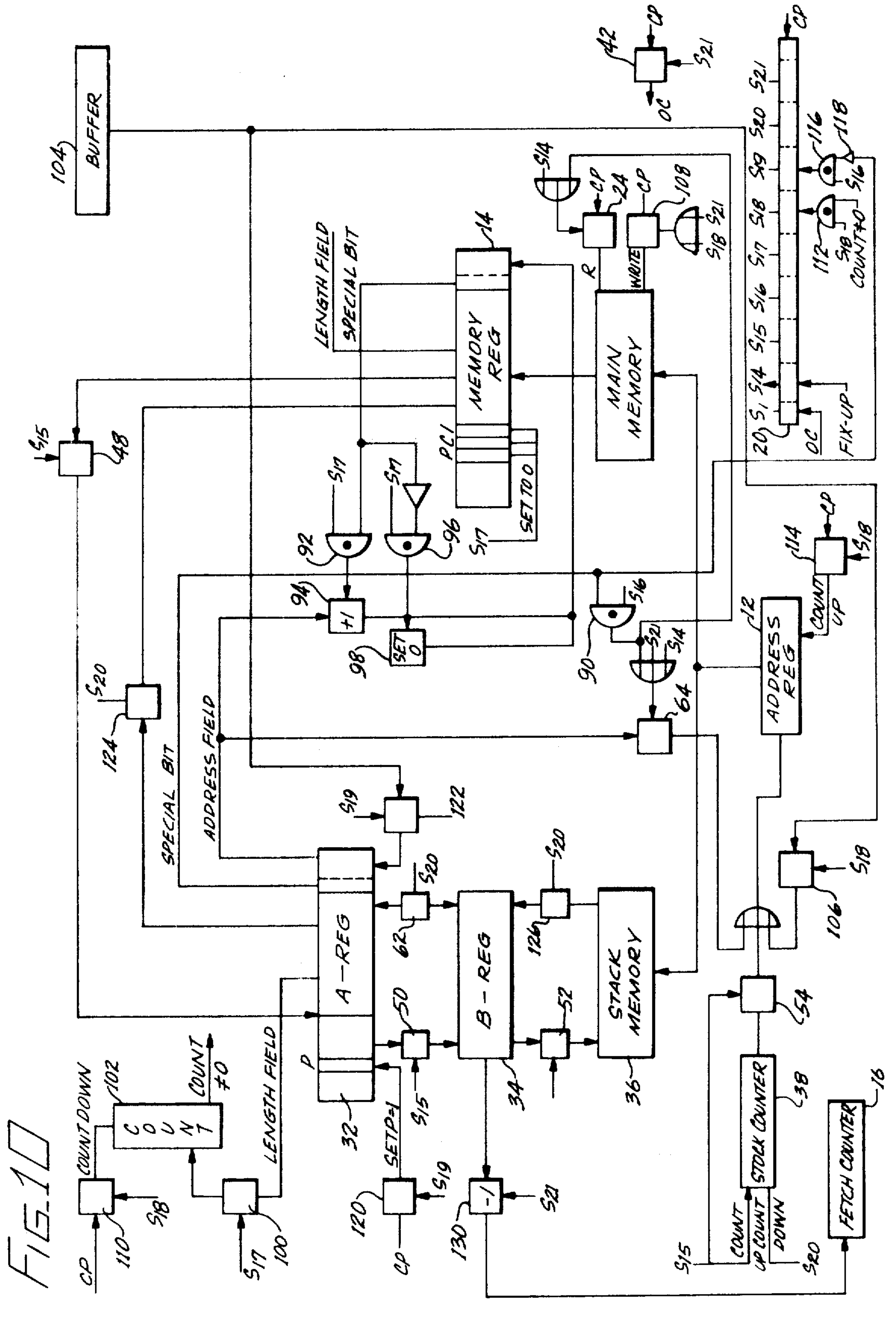
FIG. 10 is a schematic block diagram of the processor incorporating further features of the present invention.

After the required space has been assigned in memory, the master control program executes a Fixup routine which may be either a special subroutine or may be a single operator which is executed in the manner shown in more detail in FIG. 10.

Assuming a Fixup operator has been fetched to the program register 18 and decoded by the decoder 28 (FIG. 6), the sequence counter 20 is set to the $S_{14}$ state. First the address field of the copy descriptor in the A-register 32 is transferred to the memory address register 12 by applying the $S_{14}$ state to the gate 64. This places the address of the "mother" descriptor in the memory address register 12. A memory Read operation is then initiated by applying the $S_{14}$ state to the gate 24, placing the "mother" descriptor in the memory register 14. The "mother" descriptor is then transferred from the memory register 14 by the gate 48 into the A-register 32 during the $S_{15}$ state of the sequence counter 20. At the same time a stack pushdown operation is performed by applying the $S_{15}$ state to the gates 50, 52, and 54 and counting up the stack counter 38, in the manner described above. This places the copy descriptor in the B-register 34 and the "mother" descriptor in the A-register 32.

With the sequence counter 20 advancing to the $S_{16}$ state, the Special bit in the address field of the A-register 32 is tested. If the Special bit is 1, indicating that the descriptor relates to a nonpresent dope vector, an AND-circuit 90, in response to the Special bit being 1 and the $S_{16}$ state of the sequence counter 20, activates the gate 64 to transfer the address field of the "-mother" descriptor in the A-register 32 to the memory address register 12. This address points to the first location in the Array Information Table, which specifies the size of the second dimension of the array and includes a bit indicating whether there are additional dimensions in the array, as shown in FIG. 2. The size of the second dimension derived from the Array Information Table occupies the length field of the word as stored in the memory register 14 while the bit indicating whether or not there are additional dimensions in the array is stored in the Special bit position of the address field of the word as stored in the register 14.

With the sequence counter 20 advancing to the $S_{17}$ state, the address field of the word in the memory register 14 is either loaded with the address from the address field of the "mother" descriptor in the A-register 32 incremented by 1, or is set to 0, depending upon the condition of the Special bit. Thus if the Special bit is a 1, indicating there are additional dimensions in the array, an AND-circuit 92, in response to the Special bit equal to 1 and the $S_{17}$ state of the sequence counter 20, activates a circuit 94 which increments by 1 the address from the A-register 32 and places it in the address field of the register 14. An AND-circuit 96, on the other hand, in response to the Special bit when it is a 0, indicating the last dimension in the array, activates a circuit 98 to set the address field in the register 14 to 0. At the same time the Presence bit, Copy bit, and Index bit locations in the word in the register 14 are set to 0. Thus an "absent" descriptor for the first dope vector of the array has been generated in the memory register 14. Also during the $S_{17}$ state, the size of the first dimension is transferred from the length field of the descriptor in the A-register 32 by a gate 100 to a counter 102.

With the sequence counter 20 advancing to the $S_{18}$ state, the base address of the space set aside for the first dope vector by the Getspace routine, which is stored in a buffer register 104, is transferred by a gate 106 to the memory address register 12. The next clock pulse of the $S_{18}$ state is passed by a gate 108 to the Write cycle control of main memory for writing the generated descriptor for the first dope vector stored in the memory register 14 into the first location of the space in memory. At the same time the counter 102 is counted down by a clock pulse passed by a gate 100. An AND-circuit 112 sensing that the count condition of the counter 102 is $\neq$ to 0, and sensing the $S_{18}$ state, holds the sequence counter 20 in the $S_{18}$ state until the counter is counted down to 0, at which time the sequence counter 20 advances to the $S_{19}$ state. Also the address in the address register 12 is incremented by each clock pulse during the $S_{18}$ state passed by a gate 114. In this way the descriptor in the register 14 is written into successive memory locations corresponding in length to the size of the first dimension of the array specified by the "mother" descriptor in the A-register 32. Thus the first dimension dope vector is loaded into memory to provide a set of identical "absent" descriptors, each of which specifies the size of the next dimension of the array and specifies the address of the next location in the Array Information Table. The sequence counter 20, once the counter 20, once the counter 102 is counted down to 0, advances to the $S_{19}$ state. It should also be noted that the sequence counter 20 can be set directly to the $S_{19}$ state by the output of the AND-circuit 116 which senses the $S_{16}$ state of the sequence counter 20 and senses that the Special bit in the A-register 32 is 0 through an inverter 118. Thus if the Special bit in the "mother" descriptor is a 0 instead of a 1, the sequence counter advances directly from the $S_{16}$ state to the $S_{19}$ state.

It is now necessary to fix up the "mother" descriptor in the A-register 32 to reflect the fact that the first dope vector descriptors are now present in the core memory. The Presence bit is set to 1 by a clock pulse passed by a gate 120 and the address in the buffer register 104 is loaded into the address field by a gate 122. This also sets the Special bit of the address field to 0. The "mother" descriptor is now a "present" descriptor having an address field which points to the base address of the first dimension dope vector.

With the sequence counter advanced to the $S_{20}$ state, the "-mother" descriptor in the A-register 32 is transferred to the memory register 14 by a gate 124 and the stack is pushed up by transferring the copy descriptor in the B-register 34 into the A-register 32 through a gate 62. The top location of the stack in the stack memory 36 containing the Return Control Word is loaded into the B-register 34 through a gate 126 and the stack counter 38 is counted down 1. This adjusts the stack back to the condition it was in at the time the Presence Bit Interrupt was initiated.

With the copy descriptor in the A-register 32, the address field is transferred by the gate 64 to the memory address register 12 and the fixed up "mother" descriptor in the register 14 is then written into the core memory. At the same time, the return control word in the B-register 34 is loaded back into various registers. The prior contents of the fetch counter, for example, is decremented by a circuit 130 and loaded in the fetch counter 16. The fetch counter now points to the location of the program syllable which was being executed at the time the Presence Bit Interrupt was encountered. The $S_{21}$ state is applied to the gate 42 to provide an OC which terminates the interrupt and causes the object program syllable to be fetched from memory.

Figure 9:
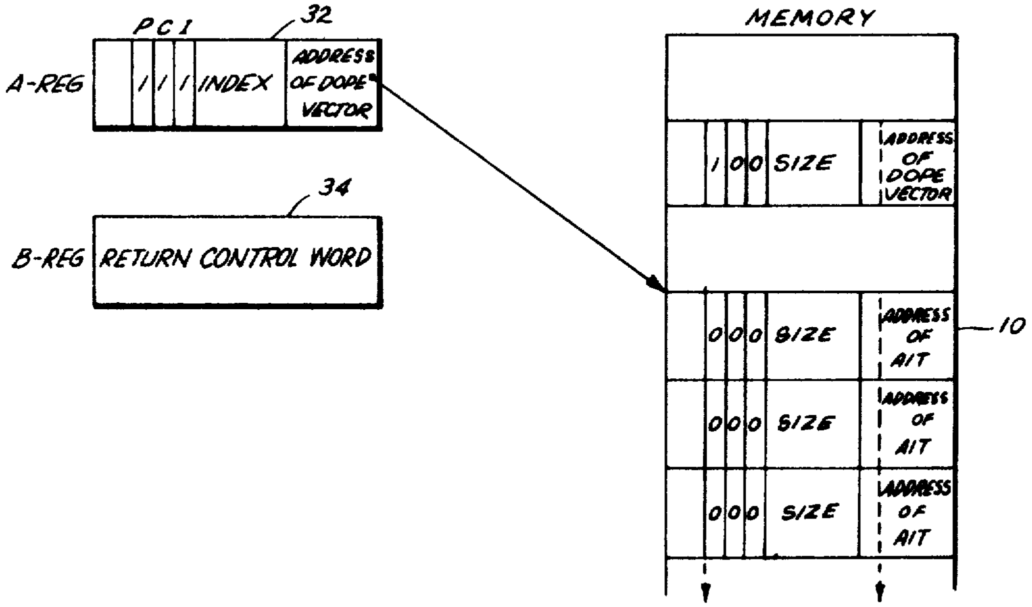

At the end of the Presence Bit Interrupt operation, the contents of the A-register, B-register, and location of the "-mother" descriptor and the newly generated dope vectors is shown in FIG. 9. The "mother" descriptor has been returned to the same location in the memory 10, but the presence bit has been turned on. The copy descriptor has been returned to the A-register and has been made to conform with the "-mother" descriptor by turning on the presence bit and changing the address field to point to the address of the dope vectors of the first array. The nonpresent dope vector has been inserted in each of the locations in memory set aside for the first dimension of the array.

The Index and Load Name operator is thus again fetched from memory and placed in the program register 18 and is again executed in the manner described above in connection with FIG. 7. However, since the "mother" descriptor has now been made "present" by loading of the first dimension dope vector into the core memory, no Presence Bit Interrupt condition will be encountered. At the completion of the Index and Load Name operation, a descriptor from the first dimension dope vector is loaded in the A-register 32.

Under the control of the program string, the above operations are repeated for each dimension of the array until the descriptor of the highest order dope vector of the array is in the stack. Use of the actual data area depends upon whether the Presence bit routine provides "overlayable" data in the data area, as described in copending application, Ser. No. 670,304, filed Sept. 25, 1967, now abandoned. or whether the program requires the space in the array for storing data. In the former case, an Index and Load Value operator is executed which is identical to the Index and Load Name operator described above, except that the actual data is placed in the top of the stack instead of a descriptor. If it is desired to store data in the particular location in the data array, an Index operator is executed which results in an address of the data area in memory being placed in the top of the stack. This is followed by a Store operator which utilizes this address to store a word of data in the addressed location.

From the above description, it will be recognized that a processor is provided by the present invention which permits dynamic allocation of memory space during the execution of a multidimensional array program. This arrangement has the advantage that only a relatively small amount of storage space need be allocated to the program at the start of execution of the program and data areas and dope vectors need be allocated memory space only when needed during the execution of the program. This greatly reduces the amount of memory space which must be allocated to a program, particularly where large multidimensional arrays are involved, thus permitting much more efficient use of memory space in a multiprocessing computer system.

What is claimed is:

1. In a computer system having a digital processor and an addressable memory storing at least one first descriptor word having an address field point to an address location in the memory, a length field and a control field, apparatus comprising means responsive to a first condition of the control field of the first descriptor word for generating a second descriptor word having an address field, a length field and a control field, said descriptor generating means including means for modifying the contents of the address field of the said first descriptor word by a predetermined amount and loading the result in the address field of the second descriptor word, said descriptor generating means further including means for loading the contents of the location in memory addressed by the address field of the first descriptor word in the length field of the second descriptor word, and means for storing the generated second descriptor word in memory.

2. Apparatus as defined in claim 1 wherein said means for the generated second descriptor word further includes means for storing the generated sound descriptor word in a number of additional locations in memory.

3. Apparatus as defined in claim 2 wherein the storing means stores the second descriptor word in a total number of locations in memory corresponding to the length field of the first descriptor word.

4. Apparatus as defined in claim 3 wherein the means for the generated second descriptor word stores the second descriptor word in sequential address locations.

5. Apparatus as defined in claim 1 wherein the descriptor generating means further includes means for setting the control field of the second descriptor word to said first condition of the control field in the first descriptor word.

6. Apparatus as defined in claim 1 further including means responsive to said first condition of the control field of the first descriptor word for setting the address field of the first descriptor word to the address of said predetermined address location where the second descriptor word is stored.

7. Apparatus as defined in claim 6 further including means response to said first condition of the control field of the first descriptor word for setting the control field of the first descriptor word to a second control condition.

8. A digital processor comprising an addressable memory, first register means for storing a descriptor word having an address field, a length field specifying the size of one dimension of a multidimensional array, and a control field, the addressable memory storing a group of array information words at sequential address locations, each array information word having a size field, means for storing the base address of a space in the memory, second register means for storing a descriptor word and having a length field, an address field, and a control field, first control means responsive to a first condition of said control field of the descriptor word in the first register means for transferring the size field of an array information word from a location in memory identified by the address field of the descriptor word in said first register means to the length field of the second register means, second control means responsive to said first condition of said control field in the first register means for setting the address field of the second register means to the address of the next location in said sequential address locations, and third control means responsive to the base address storing means and the length field in the first register means for storing the descriptor word in the second register means in a number of sequential address locations corresponding to the size specified by the length field and staring at said base address.

9. Apparatus as defined in claim 8 further including fourth control means responsive to said first condition of the control field of the descriptor word in the first register means for transferring the address in the base address storing means to the address field of the descriptor word in the first register means.

10. Apparatus as defined in claim 9 wherein the fourth control means includes means setting the control field of the descriptor word in the first register to a second control condition.

11. Apparatus as defined in claim 10 further including means indicating the last of said sequential locations of the array information words, the first control means including means responsive to said indicating means when transferring the size field from other than the last of said sequential locations for setting the control field of the second register means to said first control condition and means responsive to said indicating means when transferring the size field from the last location for setting the control field of the second register means to a third control condition.

12. The method of allocating memory space in an addressable memory to a multidimensional array in a digital computer system during execution of an object program, comprising the steps of: initially storing as part of the program in memory a first descriptor word for the first dimension of the array and a table of words containing a word for each of the higher order dimensions of the array, the first descriptor word having an address field pointing to the first word in the table, a length field defining the size of the first dimension of the array, and a control field identifying various operational conditions, the words in the table each having a length field defining the size of a corresponding one of the higher order dimensions; sensing the contents of the first descriptor whenever an element in the array is needed during execution of the program, in response to a first sensed condition of the control field of the first descriptor; obtaining an available space in memory corresponding in length to the sensed condition of the length field of the first descriptor word; generating a second descriptor word having a length field corresponding to the length field of the word in said table pointed to by the sensed address field of the first descriptor word, having an address field corresponding to the address of the next word in the table, and having a control field indicating whether the word pointed to by the address field of the first descriptor is the last word in the table; storing the second descriptor word in each location of said space in memory; changing the address field of the first descriptor word to correspond to the address of the first location in said memory space; and changing the control field to indicate a second control condition.

13. The method of allocating memory space to an array of data during execution of a program, the array having at least two dimensions, utilizing an initial descriptor word and a table of array information words stored in memory at the start of the program, the descriptor word having a length field indicating the size of the first dimension of the array, an address field indicating the address of the first word in the table, presence field indicating that the descriptor word does not point to an available space in memory, and a special field indicating that descriptors of an additional dimension to the array have not been allocated, each word in the table having a size field of one dimension of the array, and a last word field indicating whether or not the word containing the last word field is the final word in the table corresponding to the highest order dimension of the array, the method comprising the steps of:

reading out the initial descriptor word from memory the first time data in the array is needed by the program, sensing the presence field of the descriptor word to determine if the descriptor word points to available space in memory, utilizing the length field of the descriptor word to locate and identify the base address of an available space in memory corresponding in size to the length field if the presence field indicates no space has been made available, sensing the special field in the descriptor word to determine if descriptors have been allocated to the first dimension, reading out the first word in the table from the location in memory identified by the address field of the initial descriptor if the special field indicates no descriptor has been allocated to the first dimension, generating a first dimension descriptor word having a length field corresponding to the size field in the word read out of the table, a presence field indicating that that descriptor word does not point to available space in memory, a special field corresponding to the last word field in the word read out of the table, and an address field corresponding to the address of the next word in the table if the last word field indicates that the word read out of the table is not the final word in the table, and storing the first dimension descriptor word in each of the locations in the memory space made available in response to the presence field of the initial descriptor word, starting with said base address.

14. The method of claim 13 further including the steps of: setting the address field of the initial descriptor word to correspond to said base address, and changing the presence field of the initial descriptor word to indicate that the initial descriptor word now points to space made available in memory.

15. The method of allocating memory space in an addressable memory to a multidimensional array in a digital computer system during execution of an object program wherein, as part of the program, memory initially contains a first descriptor word for a first dimension of the array and a table of words containing a word for each of the other dimensions of the array, the first descriptor word point to the first word in the table and defining the size limit of the first dimension of the array, the words in the table defining the size limit of the other dimensions of the array, the method comprising the steps of: determining the size limit of the first dimension from the first descriptor word in memory, obtaining an available space in memory having a number of locations corresponding to the size limit of the first dimension of the array, generating a second descriptor word point to the second word in the table and setting the second descriptor word to define the size limit of the second dimension as defined by the first word in the table, and storing the second descriptor word in each location of said available space obtained in memory.

16. The method of claim 15 further including the step of: after generating the second descriptor word changing the first descriptor word to point to the first location of said available space obtained in memory.

17. The method of claim 16 further including the step of: after generating the second descriptor word changing the first descriptor word to signal that the second descriptor word has been generated.

* * * * *

PO-1050
(5/69)

UNITED STATES PATENT OFFICE
CERTIFICATE OF CORRECTION

Patent No. 3,624,616 Dated November 30, 1971

Inventor(s) RAJANI MANIBHAI PATEL

It is certified that error appears in the above-identified patent and that said Letters Patent are hereby corrected as shown below:

On first page of patent change Inventor's middle name to read --Manibhai-- .

Column 2, line 70 - "OPeration" should read --Operation--;
line 74 - Change "The" to --Then--.

Column 3, line 13 - "fist" should read --first--,
line 59 - "he" should read --the--.

Column 4, line 29 - After "a" insert --last-in--,
line 44 - "call" should read --Call--,
line 46 - "value" should read --Value--.

Column 5, line 38 - After "teaching" insert --of--.

Column 6, line 50 - "INterrupt" should read --Interrupt--.

Column 7, line 55 - "amino" should read --main--.

Column 8, line 29 - "While" should read --With--,
"counterset" should read --counter set--.

Column 10, line 62- After "in" insert --more detail in--.

Column 13, line 22- "point" should read --pointing--.

Column 14, line 9 - "staring" should read --starting--.

Signed and sealed this 11th day of July 1972.

(SEAL)
Attest:

EDWARD M. FLETCHER, JR.
Attesting Officer

ROBERT GOTTSCHALK
Commissioner of Patents